United States Patent [19]

Horiguchi et al.

[11] 4,066,462

[45] Jan. 3, 1978

[54] ANTI-CORROSIVE ORGANIC PIGMENT

[75] Inventors: Shojiro Horiguchi, Tokyo; Michiei Nakamura, Soka; Yoshifumi Sugito, Koshigaya, all of Japan

[73] Assignee: Dainichiseika Color & Chemicals Mfg. Co., Ltd., Tokyo, Japan

[21] Appl. No.: 717,401

[22] Filed: Aug. 24, 1976

[30] Foreign Application Priority Data

Sept. 1, 1975 Japan ................................ 75-104954

[51] Int. Cl.² .................................................. C09D 5/08
[52] U.S. Cl. ................................ 106/14; 106/288 Q; 252/390; 252/391
[58] Field of Search ............. 106/288 Q, 14; 252/390, 252/391

[56] References Cited

U.S. PATENT DOCUMENTS

| | | | |
|---|---|---|---|
| 3,239,470 | 3/1966 | Michal | 106/14 |
| 3,718,604 | 2/1973 | Scherf et al. | 106/14 |
| 3,723,347 | 3/1973 | Mitchell | 106/14 |
| 3,865,803 | 2/1975 | Falkehag | 106/90 |

*Primary Examiner*—Winston A. Douglas
*Assistant Examiner*—J. V. Howard
*Attorney, Agent, or Firm*—Oblon, Fisher, Spivak, McClelland & Maier

[57] ABSTRACT

An anti-corrosive organic pigment is prepared by mixing a lignin type compound with urea, a urea derivative, melamine, a melamine derivative, ammonia or an ammonium salt, condensing the components of the mixture by heating the mixture in a molten form, and then pulverizing or dispersing the reaction mixture to form a pigment.

15 Claims, No Drawings

ANTI-CORROSIVE ORGANIC PIGMENT

BACKGROUND OF THE INVENTION

The present invention relates to an anti-corrosive organic pigment which does not contain a toxic heavy metal compound. Various inorganic compounds have been used as anti-corrosive pigments for anti-corrosive paints which have been applied to iron and steels. Most of the anti-corrosive pigments contain toxic heavy metal compounds such as lead and chromium compounds. From the viewpoint of environmental pollution and environmental sanitation, the use of such toxic inorganic pigments in paint has been limited.

A need, therefore, has continued to exist for anti-corrosive pigments which do not contain toxic heavy metal compounds.

SUMMARY OF THE INVENTION

Accordingly, one object of the present invention is to provide an anti-corrosive organic pigment which is non-toxic and which does not result in environmental pollution.

Another object of the invention to provide an anti-corrosive organic pigment which exhibits excellent anti-corrosive effect.

These objects and other objects of the present invention can be attained by blending a lignin type compound such as lignin, lignin sulfonic acid, or humic acid with urea, a urea derivative, melamine, a melamine derivative, ammonia or an ammonium salt, thoroughly condensing the mixed components by heating the mixture to a in molten form, and then treating the reaction mixture to form a pigment.

DETAILED DESCRIPTION OF THE PREFERRED EMBODIMENTS

As a result of the study leading to the present invention, it has been found that the organic products of the invention have the unexpected property of exhibiting excellent anti-corrosive effects on metals and consequently are very useful as anti-corrosive pigment. Suitable lignin type compounds used as the starting materials for the preparation of the anti-corrosive pigments of the invention include lignin, alkali lignins, thiolignins, alkali thiolignins, lignin sulfonic acid, lignin sulfonates such as sodium, calcium, magnesium or ammonium lignin sulfonates; wastes discharged from pulp digester, humic acid, grass peat, lignite and the like. Especially preferred are lignin, lignin sulfonic acid and alkali or alkaline earth lignin sulfonates.

Suitable nitrogen containing compounds which are used as the starting materials with the lignin type compound include urea, biuret, guanidine, biguanide, dicyandiamide, melamine, ammeline ammelide, melame, ammonium carbamate, cyanates, isocyanates, methylenediurea, ammonia, ammonium carbonate, ammonium formate and the like. Especially preferred are urea and ammonia. The lignin type compound and the nitrogen containing compounds are the principal starting materials for producing the pigment of the invention.

The amount of the nitrogen compound employed in the reaction varies in the range of 0.5 to 5 parts by wt. preferably 1 to 4 parts per wt. per part by wt. of the lignin type compound. The pigment of the invention can be produced by thoroughly condensing the reactants by heating them to the molten state. It has now been found that a complicated process occurs in which, condensation, polymerization and decomposition of the starting materials repeatedly occur to form dark to black amorphous high molecular weight products having a high nitrogen content and a complicated structure. The reaction in the molten state is conducted at temperatures higher than the temperature for melting the starting materials and is in the range of 120° to 250° C preferably 160 to 220° C for about 10 to 60 hours. Preferably, the reaction is conducted to the extent necessary to increase the black color of the product and to convert it from a viscous material to a black, insoluble and infusible brittle mass. The mass is treated by the conventional pigmentation method to obtain the pigment of the invention.

The mass usually contains from 5 to 50 wt. % of water soluble components and therefore, it is highly desirable to remove the water soluble from the mass. When a modifier such as formaldehyde, paraformaldehyde, hexamethylenepentamine, di- or poly-isocyanate, methylol urea, methylol melamine, a precondensate thereof, acid anhydrides, phosphorus oxychloride, condensed polyphosphoric acid, ammonium polyphosphate, a silan coupling agent, an organic titanium chelating agent or the like is added to the reactants in the melting step or after the melting step, the reaction mixture is modified thereby decreasing the components which are soluble in water or the organic solvent. Accordingly, the modifiers are believed to function as cross-linking agent. The amount of the modifier employed is in the range of about 10 to 150 parts by wt. per 100 parts by wt. of the lignin type compound. It is especially preferable to use phosphorus oxychloride as the modifier to produce the desired product.

When an amine such as laurylamine, oleylamine, rosin amine or a urea derivative thereof is added to the lignin type compound in the melting step, it has various advantageous effects such as resulting in an increase of charged starting materials, slight by decreasing the of solidifying temperature in the melting step, rationalizing the reaction step, improving the wettability to the vehicle and increasing the hydrophobic properties of the product. These purposes can be attained by adding 0.5 to 5 wt. % of the amine to the lignin type compound although the amount used depends upon the purpose for which the product is to be used. In the treatment which results in the formation of the pigment (pigmentation) of the invention, the granules or masses of the highly condensed product obtained by the reaction which is substantially insoluble and infusible, are pulverized to a fine powder or are modified so that they are easily dispersible in a vehicle. Other various pigmentations can also be applied to produce the pigment from the reaction mixture. The pulverizing operation can be conducted by employing a dry type crusher such as an atomizer, a vibration type ball mill, a jet mill, or a wet type crusher such as a colloid mill, a ball mill, a sand grinding mill, a glass bead grinding mill, a steel ball grinding mill, or a kneader such as mixing roll, flusher and the like. It is necessary to pulverize or to disperse the reaction mixture to a fine powder having more than 95% especially more than 99% of particles having a diameter less than 44μ.

In the reaction in which the pigment of the invention is produced wherein urea and a powder containing of calcium lignin sulfonate as the main component which is produced by drying a waste solution discharged from a sulfite pulp digester are used, urea is first melted and the lignin type compound is dissolved in the molten urea to form a uniform molten mixture. When the urea melts, the decomposition of urea is initiated, whereby ammonia gas is liberated resulting in the formation of the reaction products of cyanic acid, and isocyanic acid. The lignin type compound is a material which can be converted to black, insoluble and infusible materials which are involved in complicated decomposition, condensation and addition reactions in molecules or between molecules even though the reactant is heated to the molten state. It is believed that the reaction of both starting materials in the molten form results in black brittle granules or masses which are substantially insoluble and infusible as stated above through bonding of such reactive group as amino groups, carbamido groups, urethane groups, and urea groups, to the lignin component which has a net work structure of relatively high molecular weight and has units of a hydroxy-methoxy-phenyl propane derivative such as an alcohol, ketone, aldehyde, carboxylic acid, or sulfonic acid thereof. The reaction is then further extended to a higher degree by contacting the decomposition, condensation and addition reactions depending upon the reaction in the molten state.

The anti-corrosive organic pigment of the invention has the characteristics of a pigment, that is, it is substantially insoluble and infusible to a vehicle or a solvent and is formed into a fine powder by pulverizing or dispersing. Accordingly, the pigment of the invention has excellent advantages in comparison to the cases which employ anti-corrosive materials which are soluble in a medium. The pigment of the invention is substantially unreactive with a vehicle whereby the adverse effects caused by reaction with a vehicle or an additive such as increases in viscosity, gelation, precipitation, separation, changes in quality, are not found. The amount of the anti-corrosive pigment of the invention employed can be chosen as desired regardless of the vehicle used. The characteristics of the paint and the coated film which contain the present pigment are satisfactory because the pigment of the invention is in a fine, uniformly dispersed form and accordingly, its compatibility with a vehicle and its solubility in a medium are factors which need not be considered. Moreover, the pigment exhibits no adverse affects on the characteristics of the film. Accordingly, it is possible to combine the pigment with any desired vehicle, solvent or additives without any special limitations, and it is also possible to choose the desired drying and curing conditions for optimum conditions. Various additives such as organic and inorganic pigments, alkaline earth metal oxides, hydroxides and carbonates such as zinc oxide, zinc hydroxide, zinc carbonate, and calcium carbonate and zinc powder, aluminum powder, iron oxide, zinc molybdate, zinc phosphate, and the like can be blended with the anti-corrosive pigment of the invention.

The anti-corrosive pigment of the invention can be mixed with a vehicle to prepare an anti-corrosive paint for iron and steels. Suitable vehicles include oil soluble and water reducible alkyd resin varnishes, oil soluble and water reducible epoxy ester resin varnishes, phenol resin varnishes, oil soluble and water reducible aminoalkyd resin varnishes, oil soluble and water reducible acrylic resin varnishes, oil soluble and water reducible epoxy resin varnishes, chlorinated rubber varnish, urethane resin varnishes, silicone resin varnishes, ethyl silicate varnishes, inorganic varnishes such as silica, phosphoric acid or pyrophosphate type varnishes and the like.

The amount of pigment employed in the invention is usually in the range of 2 to 30 wt.%, preferably 5 to 20 wt.% based on the vehicle. The pigment of the invention is a complicated nitrogen containing high molecular weight product and its preparation is conducted in a minimum oxidizing environment or a reducing environment when the reaction is performed in an ammonia gas environment.

It is believed that when a composition containing the pigment of the present invention is coated on an iron or steel substrate, iron ions dissociate from the surface of the iron or steel substrate and are bound in the form of a salt or chelate with the functional groups of the pigment of the invention thereby forming a layer which prevents the formation of rust of iron or steel substrate. When the pigment has reducing abilities, the surface of the iron or steel substrate can be kept in reducing environment to delay the formation and growth of rust. As stated above, the anti-corrosive pigment of the invention in an organic composition which does not contain such toxic heavy metals as lead, chromium, and the like. Accordingly, the present pigment does pose environment pollution problems. The pigment of the invention exhibits a substantially effective anti-corrosive effect per weight of the pigment and the amount of pigment used can, therefore, be small. Moreover, the starting materials for the preparation of the pigment of the invention are very cheap and, therefore, the cost of the pigment is relatively cheap. Moreover, the invention has significant advantages in that the the industrial waste which cause environmental pollution can be effectively utilized. The following examples and applications illustrate certain embodiments of the present invention and advantages of the pigment of the invention.

EXAMPLE 1

A waste solution discharged from a sulfite process pulp digester was concentrated to obtain powder containing main components of calcium lignin sulfonate, a reducing sugar, and calcium saccharose sulfate. 180 wt. parts of the powder was mixed with 360 wt. parts of urea and the mixture was directly heated by an electric heater in a reactor having plain bottom equipped with a high power stirrer.

In the operation, the powder was heated at 115° to 125° C for 13 hours with stirring and then 180 wt. parts of urea was added and the mixture was heated at 125° C for 5 hours with stirring and 180 wt. parts of urea was further added and the mixture was heated at the same temperature for 7 hours with stirring.

The reaction mixture was changed from a melt having relatively low viscosity through a viscous melt having fluidity to a melt having relatively low fluidity during the reaction. The reaction temperature was decreased to 90° C and 90 wt. parts of phosphorus oxychloride was gradually added to the reaction mixture and then the mixture was gradually heated to react them at 130 to 140° C for 7 hours and at 160° C for 5 hours and further at 145° C for 30 hours to obtain 500 wt. parts of granular black product. The black product was crushed to form fine powder and was put into 10 times of water. The mixture was stirred for 1 hour and was kept for one night and was filtered and washed with water and dried and finely crushed to obtain 390 wt. parts of fine black powder.

EXAMPLE 2

180 wt. parts of the powder containing main components of calcium lignin sulfonate, a reducing sugar and calcium saccharose sulfate of Example 1 was mixed with 180 wt. parts of urea and the mixture was heated at 115° to 125° C for 5.5 hours with stirring and then 180 wt. parts of urea was added and the mixture was heated at 125° C for 4 hours with stirring and then 180 wt. parts of urea was added and the mixture was heated at 125° to 145° C for 5 hours with stirring and 180 wt. parts of urea was further added and the mixture was heated at 140° C for 2 hours, at 120° to 135° C for 7 hours and at 130° – 150° C for 7 hours with stirring to obtain 460 wt. parts of granular black product. The black product was crushed to form fine powder and was put into 20 times of water. The mixture was stirred, filtered and washed with water and dried to obtain 370 wt. parts of black powder. The black powder was further crushed.

Application (Comparison) 1:

The fine black powder of the invention was used as an anti-corrosive pigment and the characteristics thereof were compared with those of the conventional anti-corrosive pigments.

1. Preparation of anti-corrosive paint:

In accordance with the conventional method, the anti-corrosive paints having the following formula were prepared by using the following four types of pigments as anti-corrosive pigments.

a. Anti-corrosive pigment of Example 1.
   b. Pigment composition consisting of 2 wt. parts of the pigment of Example 1 and 1 wt. part of zinc molybdate-zinc oxide ($xZnO \cdot ZnMoO_4$).
   c. Anti-corrosive pigment of zinc molybdate-zinc oxide (known pigment).
   d. Zinc chromate ZPC ($K_2CrO_4 \cdot 3ZnCrO_4 \cdot Zn(OH)_2 \cdot 2H_2O$) (known pigment).

2. Preparation of test piece:

Each paint shown in Table 1 was coated for 2 times with a brush, on a steel plate which was treated with a phosphate in a chemical corrosion treatment. The coated plate was dried without heating and then was heated by a blower-dryer to cure the coated film. The cured film was cross-cut by a knife and the edges of the test piece were sealed with wax to prepare each test piece.

3. Tests (Comparing methods):

In accordance with Japanese Industrial Standard Z-2371-1955, the salt water spray test was carried out. In accordance with Japanese Industrial Standard K-5400-1970, the salt water immersing test was carried out (5% solution of sodium chloride was used as the salt water).

4. Result:

The results were shown in Tables 2 and 3. As it is clear from the results in Tables 2 and 3, the anti-corrosive paint (1) using the anti-corrosive pigment of the invention imparted excellent anti-corrosive effect. The paint (2) using the anti-corrosive pigment of the invention and the conventional pigment imparted synergical effect in comparison with the paints (5) and (6).

Application (Comparison) 2:

In accordance with the process of Application 1 except using acrylic resin vehicle instead of the vehicle of Application 1, the paint compositions of Table 4 were prepared and the test pieces were tested by the salt water spray testing method. The results are shown in Table 5.

Application 3:

In accordance with the process of Application 1 except using the pigment of Example 2 instead of the pigment of Example 1, the test was carried. As the result, the same anti-corrosive effect was found.

Table 1

| Paint | Paint Composition | | | | | | |
|---|---|---|---|---|---|---|---|
| | 1 | 2 | 3 | 4 | 5 | 6 | 7 |
| | (part) | (part) | (part) | (part) | (part) | (part) | (part) |
| Pigment of Exp. 1 | 13.42 | 8.96 | — | — | 8.96 | — | — |
| $xZnO \cdot ZnMoO_4$ | — | 4.48 | 13.44 | — | — | 4.48 | — |
| $K_2CrO_4 \cdot 3ZnCrO_4 \cdot Zn(OH)_2 \cdot 2H_2O$ | — | — | — | 13.44 | — | — | — |
| Epikote DX-255 | 28.54 | 28.51 | 28.57 | 28.57 | 29.94 | 31.36 | 33.03 |
| Epicure 4255 | 25.41 | 25.41 | 25.35 | 25.35 | 26.68 | 27.95 | 29.42 |
| Tween 20 | 0.08 | 0.08 | 0.07 | 0.07 | 0.08 | 0.09 | — |
| 50% citric acid | — | — | 0.08 | 0.08 | — | — | — |
| Ethyleneglycol monoethyl ether | 32.55 | 32.56 | 32.49 | 32.49 | 34.34 | 36.12 | 37.55 |
| Total | 100.00 | 100.00 | 100.00 | 100.00 | 100.00 | 100.00 | 100.00 |

Table 2

| Test piece | Salt water spray test | | | | | | | non-coated plate |
|---|---|---|---|---|---|---|---|---|
| | 1 | 2 | 3 | 4 | 5 | 6 | 7 | |
| Average thickness of coated film (μ) | about 80 | about 60 | about 70 | about 65 | about 90 | about 80 | about 65 | — |
| Surface condition after 312 hours | ◎ | ◎ | ○ | ◎ | ◎-○ | ○-△ | △ | X |
| Surface condition after 500 hours | ◎ | ◎ | ○ | ◎ | ◎-○ | ○-△ | △ | X |

Table 3

| Test piece | Salt water immersing test | | | | | | | non-coated plate |
|---|---|---|---|---|---|---|---|---|
| | 1 | 2 | 3 | 4 | 5 | 6 | 7 | |
| Average thickness of coated film (μ) | about 80 | about 60 | about 70 | about 65 | about 90 | about 80 | about 65 | — |
| Surface condition after 288 hours | ◎ | ◎ | ○ | ◎ | ◎ | ○ | △ | X |

Table 3-continued

| | Salt water immersing test | | | | | | | non-coated plate |
|---|---|---|---|---|---|---|---|---|
| Test piece | 1 | 2 | 3 | 4 | 5 | 6 | 7 | |
| Surface condition after 500 hours | ◎ | ◎ | ○ | ○ | ◎/○ | ○-Δ | Δ | X |

Table 4

| | Paint Composition | | | | |
|---|---|---|---|---|---|
| Paint | 8 | 9 | 10 | 11 | 12 |
| | (part) | (part) | (part) | (part) | (part) |
| Pigment of Exp. 1 | 11.11 | 7.78 | — | — | — |
| xZnO · ZnMoO$_4$ | — | 3.89 | 11.76 | — | — |
| K$_2$CrO$_4$ · 3ZnCrO$_4$ · Zn(OH)$_2$ · 2H$_2$O | — | — | — | 11.43 | — |
| Acrylic resin | 33.33 | 35.00 | 35.29 | 34.29 | 40.54 |
| Solvent (toluene, xylene) | 55.56 | 53.33 | 52.95 | 54.28 | 59.46 |
| Total: | 100.00 | 100.00 | 100.00 | 100.00 | 100.00 |

Table 5

| | Salt water spray test | | | | | non-coated plate |
|---|---|---|---|---|---|---|
| Test piece | 8 | 9 | 10 | 11 | 12 | |
| Average thickness of coated film (μ) | about 32 | about 30 | about 50 | about 33 | about 45 | — |
| Surface condition after 500 hours | ◎ | ◎ | ○-Δ | ◎ | Δ | X |

Note:
1) Epikote DX-255: epoxy resin Epicure 4255: hardner manufactured by Shell Chem. Co. Tween 20: polyoxyethylene sorbitane monolaurate
2) The reference numer of the test pieces in Tables 2, 3 and 5 are ones prepared by coating the corresponding paints.
3) Acrylic resin (for drying at room temperature) in Table 4 is Hitaloid resin manufactured by Hitachi Kasei K.K..
4) The sumbols of ◎ ~ X in Tables 2, 3 and 5 designate the following conditions.
◎ excellent (Only slight corrosion is caused at the cross-cut)
○ good (Corrosion is caused near the cross-cut)
Δ inferior (Corrosion is caused in broad range around the cross cut).
X Corrosion is caused in all surface.

Application (Comparison)4:

The fine black powder of the invention was used as an anti-corrosive pigment and the characteristics thereof were compared with those of the conventional anti-corrosive pigments.

1. Preparation of anti-corrosive paint:

The anti-corrosive pigment of Example 1 and the pigment of zinc oxide, zinc hydroxide, zinc phosphate or zinc molybdate at the weight ratio shown in Table 6 were added and dispersed in water with stirring and then the pigments were filtered and washed with water and dried and crushed to obtain the anti-corrosive pigments (13) to (21).

The zinc chromate ZPC (22) which is the conventional anti-corrosive pigment was used as a reference.

The following four resins were used as the vehicles for paints in the preparation of paints.

A. Alkyd resin (for drying at room temperature): soy bean oil modified long chain alkyd resin;
B. Amino-alkyd resin (for baking): phenol type linseed oil modified alkyd resin and butylated melamine resin;
C. Acrylic resin (for baking): Reaction type acrylic resin and butylated melamine resin and bisphenol type epoxy resin;
D. Alkyd resin (for baking); water soluble alkyd resin and water soluble melamine resin.

In accordance with the conventional method, 10 types of the anti-corrosive paints having the formula shown in Table 7 (solid component ratio) were prepared by using 4 types of vehicles.

2. Preparation of Test piece:

Each paint was coated on both surface of a cold rolling pressed steel plate (dull surface: size 70 mm × 150 mm × 1 mm) (Japanese Industrial Standard G3141) for 2 times with a barcoater and the coated film was dried and cured in the conditions stated in Table 7. The cured film on the surface each test piece for the salt water spray test, was cross-cut by a knife, and the edges of the test pieces were sealed with wax to prepare each test piece.

3. Test (Comparing methods):
Salt water spray test and
Salt water immersing test:
(they are same with those of the Application 1).

Table 6

| | Anti-corrosive pigment | | | | | | | | |
|---|---|---|---|---|---|---|---|---|---|
| Pigment | 13 | 14 | 15 | 16 | 17 | 18 | 19 | 20 | 21 |
| Pigment of Exp. 1 | 100 | 100 | 100 | 100 | 100 | 100 | 100 | 100 | 100 |
| Zinc oxide | — | 50 | 80 | — | — | — | — | — | — |
| Zinc hydroxide | — | — | — | 35 | 50 | 65 | 80 | 62.5 | 62.5 |
| Zinc phosphate | — | — | — | — | — | — | — | 25 | — |
| Zinc molybdate | — | — | — | — | — | — | — | — | 25 |
| Total | 100 | 150 | 180 | 135 | 150 | 165 | 180 | 187.5 | 187.5 |

Water immersing test:
(Each test piece was immersed in deionized water).
4. Results:
The results are shown in Table 8.

As it is clear from the results in Table 8 (13) to (22), the anti-corrosive paints using the anti-corrosive pigment of the invention and the known pigments, imparted excellent anti-corrosive effect.

Table 7

Anti-corrosive paint

(A) Composition of alkyd type anti-corrosive paint (for drying at room temperature) (solid components) (wt. parts)

|  | A-1 | A-2 |
|---|---|---|
| Pigment (13) to (22) | 26.6 | 13.3 |
| Red iron oxide | 13.3 | 13.3 |
| Calcium carbonate | 10.1 | 20.0 |
| Talc | 3.4 | 6.7 |
| Alkyd resin (A) in Application 2 | 46.6 | 46.7 |
| Lead naphthenate | 0.59 | 0.59 |
| Cobalt naphthenate | 0.13 | 0.13 |
| Total | 100.72 | 100.72 |

Condition of treatment:
1 drying at room temperature for 10 days average thickness: about 60 μ.

(B) Composition of amino alkyd type anti-corrosive paint (for baking) (solid components) (wt. parts)

|  | B-1 | B-2 |
|---|---|---|
| Pigment (13)–(22) | 10.0 | 5.0 |
| Red iron oxide | 10.0 | 5.0 |
| Calcium carbonate | 15.0 | 20.0 |
| Talc | 15.0 | 20.0 |
| Amino alkyd resin (B) in Application 2 | | |
| modified alkyd resin | 33.0 | 33.0 |
| butylated melamine resin | 17.0 | 17.0 |
| Total | 100.0 | 100.0 |

Conditions of treatment:
1 drying at room temperature
2 preliminary drying at 80° C
3 curing at 150° C for 30 minutes average thickness; about 40μ.

(C) Composition of acrylic anti-corrosive paint (for baking) (solid components) (wt. parts)

|  | C-1 | C-2 |
|---|---|---|
| Pigment (13) – (22) | 10.0 | 5.0 |
| Red iron oxide | 10.0 | 5.0 |
| Talc | 30.0 | 40.0 |
| Acrylic resin (C) in Application 2 | | |
| reaction type acrylic resin | 35.0 | 35.0 |
| butylated maelamine resin | 10.0 | 10.0 |
| bisphenol type epoxy resin | 5.0 | 5.0 |
| Total | 100.0 | 100.0 |

Conditions of treatment:
1 drying at room temperature
2 preliminary drying at 80° C
3 curing at 150° C for 30 minutes average thickness: about 40 μ.

(D) Composition of water soluble alkyd type anti-corrosive paint (for baking) (solid components) (wt. parts)

|  | D-1 | D-2 |
|---|---|---|
| Pigment (13) – (22) | 10.0 | 5.0 |
| Red iron oxide | 10.0 | 5.0 |
| Calcium carbonate | 15.0 | 20.0 |
| Talc | 15.0 | 20.0 |
| Alkyd resin (D) in Application 2 | | |
| water soluble alkyd resin | 35.0 | 35.0 |
| water soluble melamine resin | 15.0 | 15.0 |
| Total | 100.0 | 100.0 |

Conditions of treatment:
1 drying at room temperature
2 preliminary drying at 80° C

Table 7-continued

Anti-corrosive paint
3 curing at 150° C for 30 minutes average thickness: about 40 μ.

Table 8

Test Results

(A) Alkyd type anti-corrosive paints

| Pigment | Composition | Salt water spray test (240 hours) | Salt water immersing test (240 hours) | Water immersing test (240 hours) |
|---|---|---|---|---|
| 13 | A-1 | ◎ | ◎ | ◎ |
|  | A-2 | ◎ | ◎ | ◎ |
| 14 | A-1 | ◎ | ◎ | ◎ |
|  | A-2 | ◎ | ◎ | ◎ |
| 15 | A-1 | ◎ | ◎ | ◎ |
|  | A-2 | ◎ | ◎ | ◎ |
| 16 | A-1 | ◎ | ◎ | ◎ |
|  | A-2 | ◎ | ◎ | ◎ |
| 17 | A-1 | ◎ | ◎ | ◎ |
|  | A-2 | ◎ | ◎ | ◎ |
| 18 | A-1 | ◎ | ◎ | ◎ |
|  | A-2 | ◎ | ◎ | ◎ |
| 19 | A-1 | ◎ | ◎ | ◎ |
|  | A-2 | ◎ | ◎ | ◎ |
| 20 | A-1 | ◎ | ◎ | ◎ |
|  | A-2 | ◎ | ◎ | ◎ |
| 21 | A-1 | ◎ | ◎ | ◎ |
|  | A-2 | ◎ | ◎ | ◎ |
| 22 | A-1 | ◎ | ◎ | ◎~Δ |
|  | A-2 | ◎~○ | ◎ | ○~Δ |

(B) Amino alkyd type anti-corrosive paints

| Pigment | Composition | Salt water spray test (96 hours) | Salt water immersing test (120 hours) | Water immersing test (120 hours) |
|---|---|---|---|---|
| 13 | B-1 | ◎ | ◎ | ◎ |
|  | B-2 | ◎ | ◎ | ◎ |
| 14 | B-1 | ◎ | ◎ | ◎ |
|  | B-2 | ◎ | ◎ | ◎ |
| 15 | B-1 | ◎ | ◎ | ◎ |
|  | B-2 | ◎ | ◎ | ◎ |
| 16 | B-1 | ◎ | ◎ | ◎ |
|  | B-2 | ◎ | ◎ | ◎ |
| 17 | B-1 | ◎ | ◎ | ◎ |
|  | B-2 | ◎ | ◎ | ◎ |
| 18 | B-1 | ◎ | ◎ | ◎ |
|  | B-2 | ◎ | ◎ | ◎ |
| 19 | B-1 | ◎ | ◎ | ◎ |
|  | B-2 | ◎ | ◎ | ◎ |
| 20 | B-1 | ◎ | ◎ | ◎ |
|  | B-2 | ◎ | ◎ | ◎ |
| 21 | B-1 | ◎ | ◎ | ◎ |
|  | B-2 | ◎ | ◎ | ◎ |
| 22 | B-1 | ◎ | ◎ | ◎ |
|  | B-2 | ◎~○ | ◎ | ◎ |

(C) Acrylic anti-corrosive paints

| Pigment | Composition | Salt water spray test (120 hours) | Salt water immersing test (240 hours) | Water immersing test (240 hours) |
|---|---|---|---|---|
| 13 | C-1 | ◎ | ◎ | ◎ |
|  | C-2 | ◎ | ◎ | ◎ |
| 14 | C-1 | ◎ | ◎ | ◎ |
|  | C-2 | ◎ | ◎ | ◎ |
| 15 | C-1 | ◎ | ◎ | ◎ |
|  | C-2 | ◎ | ◎ | ◎ |
| 16 | C-1 | ◎ | ◎ | ◎ |
|  | C-2 | ◎ | ◎ | ◎ |
| 17 | C-1 | ◎ | ◎ | ◎ |
|  | C-2 | ◎ | ◎ | ◎ |
| 18 | C-1 | ◎ | ◎ | ◎ |
|  | C-2 | ◎ | ◎ | ◎ |
| 19 | C-1 | ◎ | ◎ | ◎ |
|  | C-2 | ◎ | ◎ | ◎ |
| 20 | C-1 | ◎ | ◎ | ◎ |
|  | C-2 | ◎ | ◎ | ◎ |
| 21 | C-1 | ◎ | ◎ | ◎ |
|  | C-2 | ◎ | ◎ | ◎ |
| 22 | C-1 | ◎~○ | ◎ | ◎ |
|  | C-2 | Δ | ◎ | ◎ |

(D) Water soluble alkyd type anticorrosive paint

| Pigment | Composition | Salt water spray test (96 hours) | Salt water immersing test (96 hours) | Water immersing test (96 hours) |
|---|---|---|---|---|

Table 8-continued

| | | Test Results | | |
|---|---|---|---|---|
| 13 | D-1 | ◯ | ◯ | ◯ |
| | D-2 | ◯ | ◯ | ◯ |
| 14 | D-1 | ◯ | ◯ | ◯ |
| | D-2 | ◯ | ◯ | ◯ |
| 15 | D-1 | ◯ | ◯ | ◯ |
| | D-2 | ◯ | ◯ | ◯ |
| 16 | D-1 | ◯ | ◯ | ◯ |
| | D-2 | ◯ | ◯ | ◯ |
| 17 | D-1 | ◯ | ◯ | ◯ |
| | D-2 | ◯ | ◯ | ◯ |
| 18 | D-1 | ◯ | ◯ | ◯ |
| | D-2 | ◯ | ◯ | ◯ |
| 19 | D-1 | ◯ | ◯ | ◯ |
| | D-2 | ◯ | ◯ | ◯ |
| 20 | D-1 | ◯ | ◯ | ◯ |
| | D-2 | ◯ | ◯ | ◯ |
| 21 | D-1 | ◯ | ◯ | ◯ |
| | D-2 | ◯ | ◯ | ◯ |
| 22 | D-1 | ◯ | ◯ | ◯ |
| | D-2 | ◯-◯ | ◯ | ◯ |

EXAMPLE 3

400 wt. parts of the powder of Example 1 containing main components of calcium lignin sulfonate, a reducing sugar and calcium saccharose sulfate was mixed with 800 wt. parts of urea and 5 wt. parts of oleylamine was added to it. The mixture was heated at 130° to 140° C for 1.5 hours with stirring and 800 wt. parts of urea was further added and the mixture was heated at 140° to 150° C for 1.5 hours with stirring. The reaction temperature was falled to 95° C and 200 wt. parts of phosphorus oxychloride was gradually added, and the mixture was heated with stirring at 170° to 190° C for 4 hours and at 210° C for 7 hours. 10,000 wt. parts of the product was charged into water and was filtered after stirring for 1 hour and washed with water and filtered. The cake was further dispersed in 10,000 wt. parts of water and was crushed by a wet disperser to form fine powder. The product was kept for one night and was filtered and washed with water and dried and crushed to obtain 750 wt. parts of fine water insoluble black powder.

Application 5

In accordance with the process of Application 4 except using the pigment of Example 3, the tests were carried out. As the results, excellent anti-corrosive effects were found.

EXAMPLES 5 to 8

In accordance with the process of Example 1 or 4 except using the starting materials shown in Table 9, anti-corrosive pigments were prepared and the tests were carried out by using the pigments. The starting materials and the anti-corrosive effects are shown in Table 9.

Table 9

| | Exp. 5 | Exp. 6 | Exp. 7 | Exp. 8 |
|---|---|---|---|---|
| Powder of Ca lignin sulfate, reducing sugar and Ca saccharose sulfate of Example 1 | 180 | | | |
| 50% solution of the powder of Example 1 | | 80 | | |
| Alkali lignin | | | 40 | |
| Fumic acid | | | | 20 |
| Ammonia (blowing) | blowing | | | |
| Urea | | 160 | 160 | 80 |
| Phosphorus oxychloride | 90 | 20 | | 10 |
| Oleyl amine | | 1 | | |
| Rosin amine | | | 1 | |
| Paraformaldehyde | | | 20 | |
| Anti-corrosive effect | good | excellent | good | good |

EXAMPLES 9 to 12

In accordance with the process of Example 1 except using the lignin type compound, urea and the modifier stated in Table 10, anti-corrosive pigments were prepared and the tests were carried out by using the pigments. The starting materials and the anti-corrosive effects are shown in Table 10.

Table 10

| | 9 | 10 | 11 | 12 |
|---|---|---|---|---|
| Lignin type compound | | | | |
| Pigment of Exp. 1 | 40 | | | |
| Powder of Ca lignin sulfate (no saccharose) | | 20 | 20 | 20 |
| Urea | 160 | 100 | 100 | 100 |
| Modifier | | | | |
| Condensed polyphosphoric acid | 20 | | | |
| Bulyl ether of methylol melamine | 5 | | | |
| Lauryl urea | | 0.5 | | |
| Reaction product of trimethylolpropane and tolylene-diisocyanate (1:3) | | | 5 | |
| Titanium acetylacetonate | | | | 5 |
| Anti-corrosive effect | good | good | good | good |

EXAMPLES 13 to 16

In accordance with the process of Example 1 except using biuret, biguanide, ammonium cyanate or methylenediurea, anti-corrosive pigments were prepared and the tests were carried out by using the pigments. The anti-corrosive effects are shown in Table 11.

Table 11

| | Nitrogen compound | Anti-corrosive effect |
|---|---|---|
| Example 13 | biuret | good |
| Example 14 | biguanide | good |
| Example 15 | ammonium cyanate | good |
| Example 16 | methylenediurea | good |

What is claimed is:

1. An anti-corrosive organic pigment prepared by a process, comprising:
   mixing 1 part by wt of a lignin compound with from 0.5 to 5 parts by wt. of at least one nitrogen containing compound selected from the group consisting of urea, biuret, guanidine, biguanide, dicyandiamide, melamine, ammeline ammelide, melame, ammonium carbamate, cyanates, isocyanates, methylenediurea, ammonia, ammonium carbonate, and ammonium formate;
   condensing said compounds by heating the mixture to the molten state, and
   preparing said pigment by pulverizing, grinding or dispersing said condensed product.

2. The anti-corrosive organic pigment of claim 1, wherein the lignin compound is selected from the group consisting of lignin,, alkali lignin, thiolignin, alkali thiolignin, lignin sulfonic acid, lignin sulfonate, a waster discharged from a pulp digester which contains lignin sulfate, humic acid, grass peat and lignite.

3. The anti-corrosive organic pigment of claim 1, wherein the lignin compound is the waste discharged from a pulp digester which contains calcium lignin sulfonate.

4. The anti-corrosive organic pigment of claim 1, wherein the nitrogen containing compound is selected from the group consisting of urea, biuret, guanidine, biguanide, dicyandiamide, melamine, ammonium carbonate, cyanate, isocyanate, methylenediurea, ammonia and ammonium formate.

5. The anti-corrosive organic pigment of claim 1, wherein the nitrogen compound is urea.

6. The anti-corrosive organic pigment of claim 1, wherein the weight ratio of the lignin compound to the nitrogen compound is in a range of 1 to 4.

7. The anti-corrosive organic pigment of claim 1, wherein a modifier is added to said reactants in the reaction at a weight ratio of 10 to 150 wt: % based on the lignin type compound.

8. The anti-corrosive organic pigment of claim 7, wherein the modifier is selected from the group consisting of formaldehyde, paraformaldehyde, hexamethylpentamine, di- or poly-isocyanate, methylol urea, methylol melamine, a precondensate thereof, an acid anhydride, phosphorous oxychloride, a condensed polyphosphoric acid, ammonium polyphosphate, a silan coupling agent and an organic titanium chelating agent.

9. The anti-corrosive organic pigment of claim 1, wherein an amine or a urea derivative thereof is added to the reactants of said reaction in a weight ratio of 0.5 to 5 weight % based on the lignin compound.

10. The anti-corrosive organic pigment of claim 1, wherein the reaction mixture is pulverized to a powder which has more than 95 wt.% of particles having a diameter less than 45$\mu$.

11. An anti-corrosive paint composition, which comprises:
a mixture of an anti-corrosive organic pigment prepared by mixing and condensing a reactant mixture of 1 part by wt. of a lignin compound and from 0.5 to 5 parts by wt. of a nitrogen containing compound selected from the group consisting of urea, biuret, guanidine, biguanide, dicyandiamide, melamine, ammeline, ammelide, melame, ammonium carbamate, cyanates, isocyanates, methylenediurea, ammonia, ammonium carbonate, ammonium formate, and a paint vehicle.

12. The paint composition of claim 11, wherein the lignin compound is selected from the group consisting of lignin, alkali lignin, thiolignin, alkali thiolignin, lignin sulfonic acid, lignin sulfonate, a waste discharged from a pulp digester which contains lignin sulfate, humic acid, grass peat and lignite.

13. The paint composition of claim 11, wherein the nitrogen containing compound is selected from the group consisting of urea, biuret, guanidine, biguanide, dicyandiamide, melamine, ammonium carbonate, cyanate, isocyanate, methylenediurea, ammonia and ammonium formate.

14. The paint composition of claim 11, wherein said vehicle is selected from the group consisting of oil soluble and water reducible alkyd resin varnishes, oil soluble and water reducible epoxy ester resin varnishes, phenol resin varnishes, oil soluble and water reducible aminoalkyd resin varnishes, oil soluble and water reducible acrylic resin varnishes, oil soluble and water reducible epoxy resin varnishes, chlorinated rubber varnishes, urethane resin varnishes, silicone resin varnishes, ethyl silicate varnishes, inorganic varnishes such as silica, phosphoric acid and pyrophosphate type varnishes and the like.

15. The paint composition of claim 11, wherein the amount of said pigment ranges from 2 to 30 weight % based on said vehicle.

* * * * *